United States Patent
Sholtis et al.

(10) Patent No.: US 7,979,386 B1
(45) Date of Patent: Jul. 12, 2011

(54) METHOD AND SYSTEM FOR PERFORMING SEARCH ENGINE OPTIMIZATIONS

(75) Inventors: Steven A. Sholtis, El Dorado Hills, CA (US); Nathan Alan Terres, Campbell, CA (US); Ryan James Yarwood, El Dorado Hill, CA (US)

(73) Assignee: Intuit Inc., Mountain View, CA (US)

( * ) Notice: Subject to any disclaimer, the term of this patent is extended or adjusted under 35 U.S.C. 154(b) by 409 days.

(21) Appl. No.: 12/165,493

(22) Filed: Jun. 30, 2008

(51) Int. Cl.
*G06F 7/00* (2006.01)
*G06F 17/00* (2006.01)
*G06F 17/30* (2006.01)

(52) U.S. Cl. .................................................. 707/603
(58) Field of Classification Search .................. None
See application file for complete search history.

(56) References Cited

U.S. PATENT DOCUMENTS

2008/0195462 A1* 8/2008 Magdon-Ismail et al. ...... 705/10

OTHER PUBLICATIONS

Lee et al "Visualization and Analysis of Clickstream Data of Online Stores for Understanding Web Merchandising", Data Mining and Knowledge Discovery, vol. 5, Nos. 1-2, pp. 59-84, 2001, Kluwer Academic Publishers.*

* cited by examiner

*Primary Examiner* — Michael Hicks
(74) *Attorney, Agent, or Firm* — Osha • Liang LLP

(57) ABSTRACT

In general, the invention relates to a method for performing search engine optimizations using a financial application configured to manage a number of products. The method includes obtaining product data from the financial application, where the product data is associated with a first product of the number of products. The method further includes processing the product data to obtain optimization data, where the optimization data is configured to increase web traffic of a web page associated with the first product. The method further includes sending the optimization data to the financial application, where the web page is updated based on the optimization data.

27 Claims, 6 Drawing Sheets

METHOD AND SYSTEM FOR PERFORMING SEARCH ENGINE OPTIMIZATIONS

BACKGROUND

Commonly, a seller of goods uses a financial application to manage an inventory of products sold by the seller. Specifically, the entity uses the financial application to track information related to the products (e.g., product descriptions, price of products, related products, etc.). In many cases, an e-commerce web site may be used by the seller of goods to sell the products. The e-commerce web site may also include a variety of information related to the products.

The seller may wish to include product information for a product from the financial application in the e-commerce web site related to the product. Specifically, the seller may extract the product information from the financial application and then use the product information to build or modify the e-commerce web site. In some cases, the product information may be modified before building or modifying the e-commerce web site. Further, the seller may wish to also include any such modifications in the financial application.

Sales of an e-commerce site are generally driven by the web traffic of the e-commerce site. Much of an e-commerce site's web traffic originates from various search engines found on the world wide web (www). In view of this, it may be desirable to optimize the product information to increase the e-commerce site's search ranking for the search engines. Typically, the product information is manually analyzed for potential optimizations such as keywords (e.g., uniform resource locator, content, header, domain name, etc.), ingoing links, outgoing links, frequency of updates, etc.

SUMMARY

In general, in one aspect, the invention relates to a method for performing search engine optimizations using a financial application configured to manage a number of products. The method includes obtaining product data from the financial application, where the product data is associated with a first product of the number of products. The method further includes processing the product data to obtain optimization data, where the optimization data is configured to increase web traffic of a web page associated with the first product. The method further includes sending the optimization data to the financial application, where the web page is updated based on the optimization data.

In general, in one aspect, the invention relates to a system for performing search engine optimizations using a financial application configured to manage a number of products. The system includes an application interface configured to obtain product data from the financial application, where the product data is associated with a first product of the number of products, and send optimization data to the financial application. The system further includes a search optimization module configured to process the product data to obtain the optimization data, where the optimization data is configured to increase web traffic of a web page associated with the first product, where the web page is updated based on the optimization data.

In general, in one aspect, the invention relates to a computer readable medium, embodying instructions executable by the computer to perform method steps for search engine optimizations using a financial application configured to manage a number of products, the instructions including functionality to obtain product data from the financial application, where the product data is associated with a first product of the number of products. The instructions further include functionality to process the product data to obtain optimization data, where the optimization data is configured to increase web traffic of a web page associated with the first product. The instructions further include functionality to send the optimization data to the financial application, where the web page is updated based on the optimization data.

Other aspects of the invention will be apparent from the following description and the appended claims.

DETAILED DESCRIPTION

Figure 1:
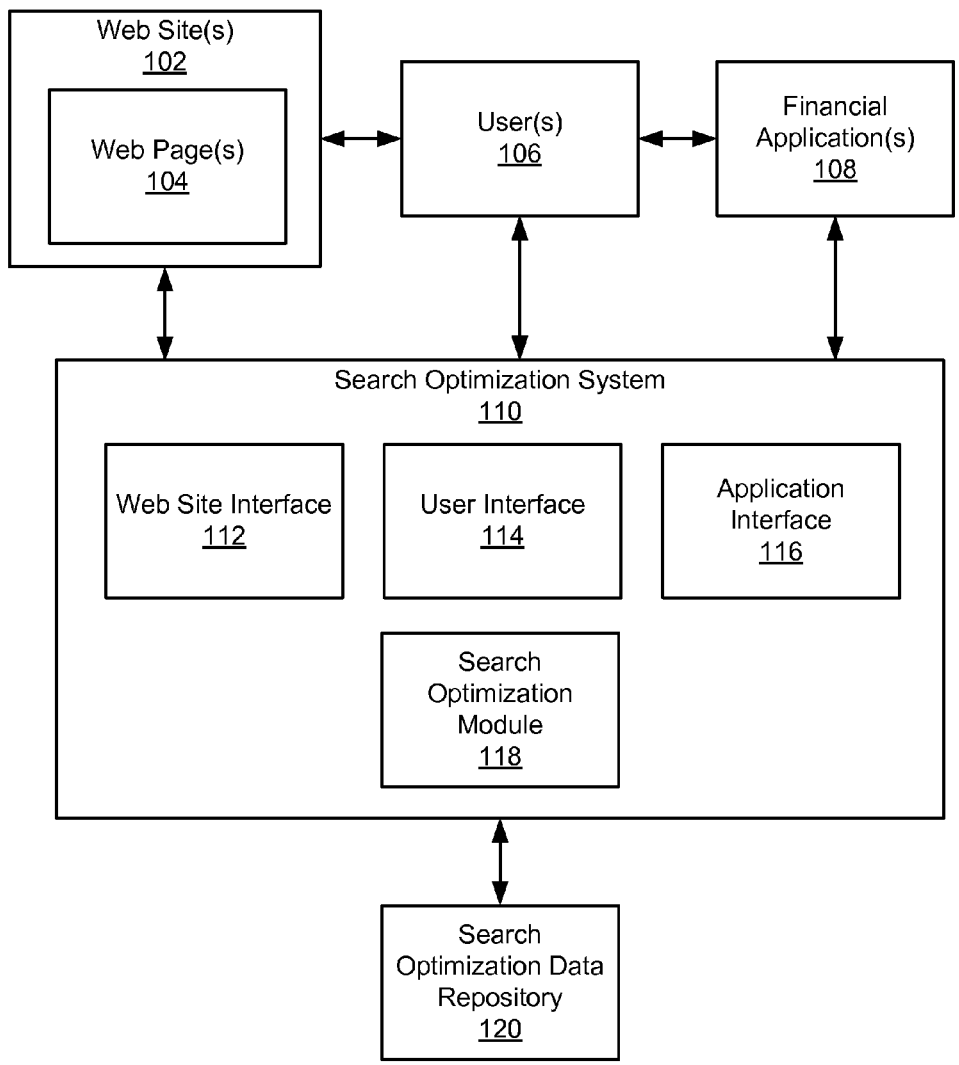
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to providing a method and a system for search engine optimizations. More specifically, embodiments of the invention provide a method and system to generate optimization data based on product data associated with a product, where the optimization data is used to update a web page configured to sell the product. Further, the optimization data may also be based on a search optimization history including data related to previous search optimizations performed for other products in the same category as the product.

FIG. 1 shows a system for performing search engine optimizations in accordance with one or more embodiments of the invention. The system includes a search optimization system (110) interacting with web sites (102), financial application(s) (108), user(s) (106), and a search optimization data repository (120). The financial application(s) (108) and web sites (102) further interact with the user(s) (106). The search optimization system (110) further includes a web site interface (112), a user interface (114), an application interface (116), and a search optimization module (118). Each of the aforementioned components of FIG. 1 is described below.

In one or more embodiments of the invention, the financial application(s) (108) are configured to interact with the user(s) (106). More specifically, the financial application(s) (108) may be configured to manage an inventory of products for sale by the user(s) (106). For example, the user(s) (106) may use the financial application(s) (108) to track information related to the products sold by the user(s) (106). In this example, the user(s) (106) may manually enter product data associated with the products into the financial application(s) (108). Those skilled in the art will appreciate that the user(s) (106) may be any entity (e.g., an individual, group of individuals, organization, or other legal entity) capable of participating in financial transactions.

In one or more embodiments of the invention, the financial application(s) (108) may also be configured to interact with the search optimization system (110). More specifically, the financial application(s) (108) are configured to provide the search optimization system (110) with product data for products sold by the user(s) (106). For example, the search optimization system (110) may be configured to interact with the financial application(s) (108) using an application interface (116). More specifically, the application interface (116) may be configured to receive the product data from the financial application(s) (108). Product data associated with a product may specify, but is not limited to, a user (106), a web page location, targeted search engine(s), a product description, and/or keywords for the product.

Those skilled in the art will appreciate that in some embodiments of the invention, the search optimization system (110) may be included as a component of a financial application (108). In this case, the financial application (108) may be configured to directly utilize the search optimization system (110) as a component. Further, the financial application (108) may also be configured to provide interfaces that allow external systems to access the search optimization system (110). For example, the financial application (108) may be a web application that provides access to product data to user(s) (106). In this example, the search optimization system (110) may be one of the services provided by the web application for managing products sold by the user(s) (106).

In one or more embodiments of the invention, the web site(s) (102) may be configured to interact with user(s) (106). More specifically, the web site(s) (102) may be configured to allow a user (106) to modify web page(s) (104) included in the web site(s) (102). For example, a user (106) may modify a web page (104) of a web site (102) using a web server (not shown) serving the web site (102). Those skilled in the art will appreciate that a web site (102) may have any number of web pages (104).

In one or more embodiments of the invention, a web site (102) may correspond to an e-commerce site. An e-commerce site may be any web site (102) configured to facilitate the sale of products for a user (106). In this example, the e-commerce site may have a number of web pages (104), where each web-page may be configured to sell a product for the user (106).

In one or more embodiments of the invention, the web site(s) (102) may be further configured to interact with the search optimization system (110). More specifically, the web site(s) (102) may be configured to provide data associated with web page(s) (104) to the search optimization system (110). For example, a web site (102) may be configured to provide a web page search profile to the search optimization system (110). In this example, the web page search profile may include a variety of information related to searching (e.g., keywords, meta-tags, Uniform Resource Locator (URL), title, etc.) for the web pages (104) of the web site (102).

In one or more embodiments of the invention, the search optimization system (110) may be configured to obtain and store information in the search optimization data repository (120). The search optimization data repository (120) may be a data store (e.g., a database, a file system, one or more data structures configured in a memory, an extensible markup language (XML) file, some other medium for storing data, or any suitable combination thereof), which may include data (e.g., product data, search engine data, user data, search optimization history, etc.) related to search optimizations.

In one or more embodiments of the invention, the search optimization system (110) may be configured to process product data using a search optimization module (118). More specifically, the search optimization module (118) may be configured to process product data to obtain optimization data. For example, the search optimization module (118) may be configured to analyze product data based on search engine data to obtain optimization data. In this example, the optimization data includes recommendations for updating a web page (104) to increase web traffic from the corresponding search engine(s). Those skilled in the art will appreciate that optimization data for the web page (104) may include a variety of recommendations (e.g., alternate keywords for use in a product description, recommended ingoing links, recommended outgoing links, etc.). In this case, an ingoing link may be any link from an external web site directing a visitor to a web site (108) including the web page (104). Further, an outgoing link may be any link on the web page (104) directing a visitor to an external web site from the web site (108) including the web page (104).

In one or more embodiments of the invention, the search optimization module (118) may process product data based on search engine data in the search optimization data repository (120). For example, a particular search engine may heavily favor keywords used in uniform resource locators. In this example, the search optimization module (118) would favor recommending keywords in uniform resource locators when processing product data for the particular search engine. Those skilled in the art will appreciate that product data may be processed based on search engine data for any number of search engines. Further, the search engine data in the search optimization data repository (120) may be based on previous search optimizations. Specifically, search engine data may be obtained based on a previous search optimization as well as the results (i.e., resulting search ranking of updated web page (104)) of implementing the previous search optimization. Those skilled in the art will appreciate that the search engine data in the search optimization data repository (120) may also be based on commonly available data for the search engines.

In one or more embodiments of the invention, the user(s) (106) may interact with the search optimization system (110). For example, the user(s) (106) may access the search optimization system (110) over the Internet (or other Wide Area Network or Local Area Network) through a web browser (or via another interface for communicating over a network). Alternatively, the user(s) (106) may interact with the search optimization system (110) through an application running natively on the user's (106) local computer (not shown). Further, in one or more embodiments of the invention, the search optimization system (110) may interact with the user(s) (106) through use of notifications. The notifications may be conveyed by electronic mail, short message service (SMS), or some other form of electronic correspondence.

In one or more embodiments of the invention, the search optimization system (110) is configured to receive requests for search optimizations from the user(s) (106). A request for a search optimization may include a variety of product data (e.g., product description, target search engine, keywords, etc.). In this case, the search optimization system (110) may be configured to generate optimization data based on the product data for the user(s) (106). Those skilled in the art will appreciate that the search optimization system (110) may be configured to obtain product data for a user (106) from any number of financial application(s) (108).

In one or more embodiments of the invention, the search optimization system (110) may be configured to interact with the user(s) (106) using a user interface (114). More specifically, the user interface (114) may be configured to provide optimization data to the user (106). For example, the user (106) may request a search optimization for a web page (104) of the user (106). In this example, the user interface (114) may process the request to generate optimization data associated with the web page (104). The user interface (114) may then present the optimization data to the user (106). Those skilled in the art will appreciate that the user (106) may request optimization data based on a variety of criteria (e.g., target search engine(s), preferred web page modification method, etc.).

Figure 2:
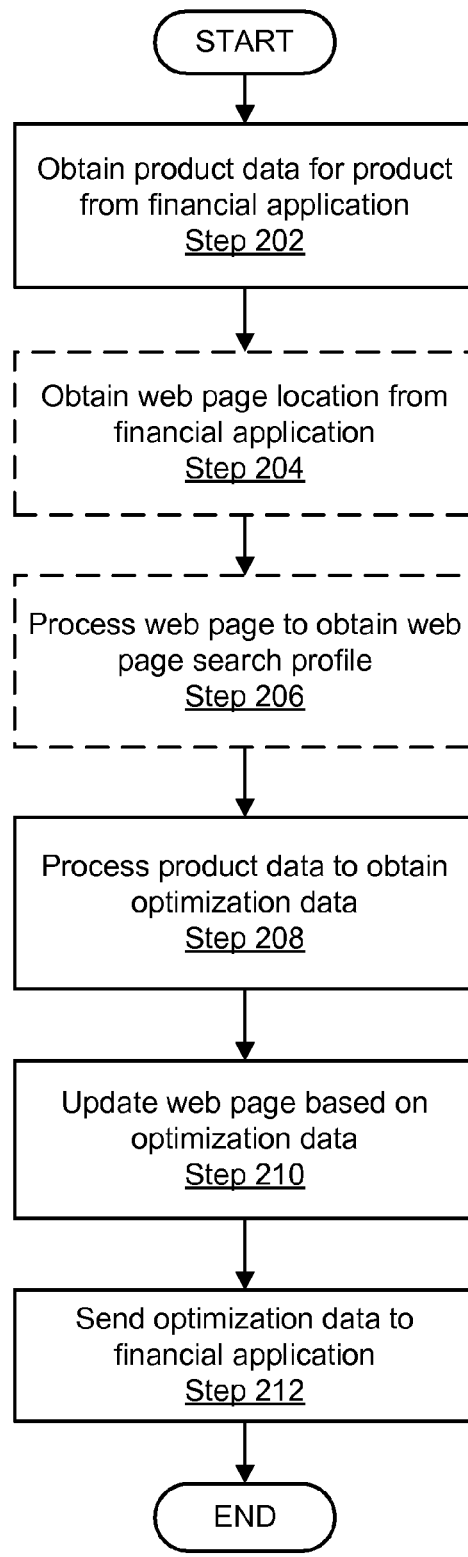
FIGS. 2-5 show flow charts in accordance with one or more embodiments of the invention.

FIG. 2 shows a flow chart for performing search engine optimizations in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 202, product data for a product may be obtained from a financial application. In one or more embodiments of the invention, the product data includes a variety of data (e.g., product description, keywords, etc.) associated with the product. Those skilled in the art will appreciate that the product data may further include, but is not limited to, search engine data, consumer account data, or some other data related to the user's product. In one or more embodiments of the invention, the financial application is used by the consumer to manage an inventory of products for sale by the user. For example, the product data is entered into the financial application by the user. In another example, the product data may be obtained by the financial application from another data source (e.g., sales system, inventory system, etc.) associated with the user.

In one or more embodiments of the invention, the product data is included in a request for optimization data from the user of the financial application. In other cases, the product data is obtained from the financial application on-demand and/or based on a schedule (e.g., hourly, daily, weekly, etc.).

Optionally, in Step 204, a web page location may be obtained from the financial application. More specifically, the request for optimization data from the user may further specify the location of a web page for selling the product of the user. For example, the request may include a URL to web page of an e-commerce site for selling the product. Further, the web page location may include information related to Application Program Interfaces (API) and/or Web Services for updating the web page (i.e., interfaces for the web server providing the web site).

Optionally, in Step 206, the web page may be processed to obtain a web page search profile. More specifically, the web page may be processed to identify characteristics of the web page that attribute to the search ranking of the web page. In this case, the search ranking of the web page may correspond to the priority of the web page in searches of a particular search engine. Further, examples of characteristics of the web page may include, but are not limited to, keywords, ingoing links, and outgoing links.

In Step 208, the product data may be processed to obtain optimization data. More specifically, the product data may be analyzed to obtain optimization data for increasing web traffic to the web page. For example, a product description included in the product data may be analyzed to identify keywords and recommended keyword replacements. In this example, the recommended keyword replacements may be configured to improve the search ranking of the web page. In addition, the frequency of keywords may also be analyzed to identify optimal keywords for replacing. In this case, for example, the overuse of a keyword may negatively affect the search ranking of a web page.

Those skilled in the art will appreciate that the search ranking of a web page may be improved based on a variety of characteristics. Further, each search engine may rely on distinct criteria for determining the search ranking of a web page. In this case, the criteria of each of the search engines may be considered when generating the optimization data.

In one or more embodiments of the invention, the optimization data includes recommendations for updating the web page. In this case, the recommendations are configured to be used by a user to update the web page via a web server serving the web page. In other cases, the optimization data may be configured to be used by a search optimization system as discussed above with respect to FIG. 1 to automatically modify the contents of the web page.

In one or more embodiments of the invention, the optimization data also includes a predicted search ranking for the web page. The predicted search ranking may be generated based on recommendations included in the optimization data. Specifically, the predicted search ranking predicts the search ranking of the web page if the recommendations in the optimization data are implemented.

Optionally, in one or more embodiments of the invention, the generation of the optimization data is also based on the web page search profile for the web page. In this case, for example, the outgoing links specified in the web page search profile may be analyzed to obtain recommended outgoing links. Examples of recommended outgoing links may include, but are not limited to, recommendations to update current outgoing links, addition of new outgoing links, and removal of detrimental outgoing links. Outgoing links to related web sites typically increase the search ranking of a web page. However, an outgoing link to a related web site of a lower quality (e.g., link farms, automated linking systems) may have a negative affect on the search ranking of the web page.

In Step 210, the web page is updated based on the optimization data. For example, the user may update the web page based on the recommendations included in the optimization data. In this example, the user may use a web server of the web page to implement the recommendations. In another example, the optimization data may be automatically incorporated into the web page. In this example, an API and/or Web Service may be used to dynamically modify the contents of the web page based on the optimization data.

In Step 212, the optimization data is transmitted to the financial application. At this stage, the optimization data may be used to update the product data in the financial application. For example, if the optimization data includes an updated product description, the updated product description may be stored for the product.

Figure 3:
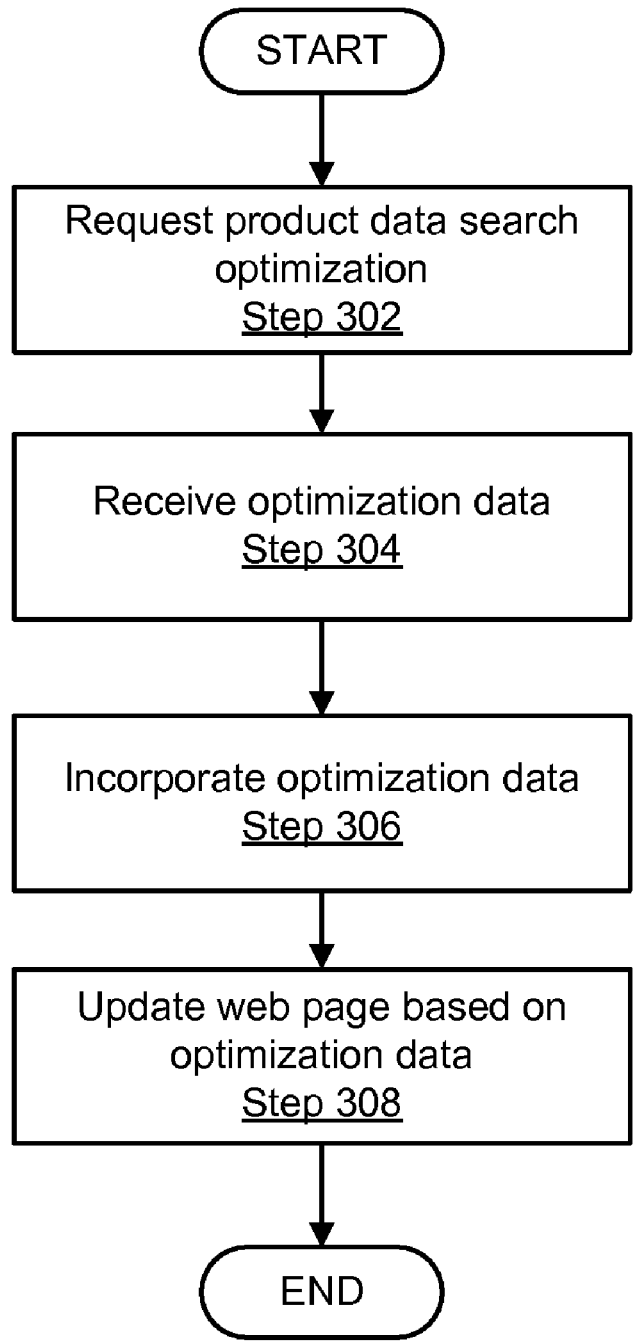

FIG. 3 shows a flow chart for performing search engine optimization in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 302, a search optimization of product data is requested. More specifically, a request for search optimization of product data is transmitted to a search optimization system as described above with respect to FIG. 1. The request may include a variety of data including, but not limited to, product data, search engine data, and a web page location.

Optionally, the request may also specify target search engine(s) for the search optimization.

Optionally, the request for search optimization may further specify that the search ranking of a web page should be monitored. In this case, the search ranking of the web page may also be received when the search ranking is updated. For example, after the web page is updated and re-indexed by a search engine, the search ranking of the web page is also updated, triggering a notification of the updated search ranking. In addition, the search ranking of the web page may also be monitored to generate a search optimization history for the web page. The search optimization history may track the search rankings of the web page for search engine(s) over a period of time. Further, the search optimization history may specify product data for the product associated with the web page.

At this stage, optimization data is received in response to the request for search optimization (Step 304). In Step 306, the optimization data is incorporated. More specifically, a financial application as described above with respect to FIG. 1 incorporates updated product data included in the optimization data. For example, the optimization data may include an updated product description and/or updated keywords for a product managed by the financial application. In this example, the updated product data may be reviewed and approved by a user of the financial application before it is incorporated into the financial application.

In Step 308, a web page is updated based on the optimization data. For example, a user of the financial application may update the web page via a web server based on recommendations included the optimization data. In another example, the financial application may automatically update the web page based on the optimization data via an API and/or Web Service. In this example, the updates to the web page may be reviewed and approved by the user before the updates are committed to the web page.

Figure 4:
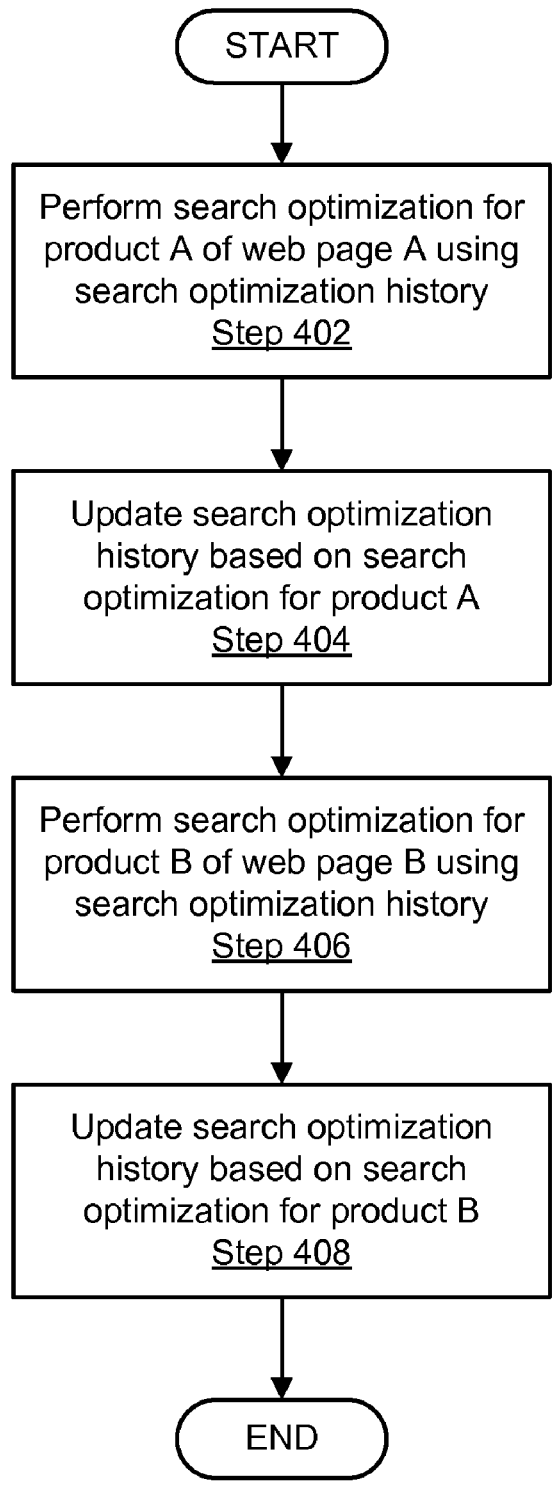

FIG. 4 shows a flow chart for performing search engine optimizations in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In Step 402, a search optimization is performed for product A of web page A using a search optimization history in accordance with one or more embodiments of the invention. In one or more embodiments of the invention, the search optimization for product A is as described with respect to FIG. 2 above. In this case, the search optimization history may be associated with a category of product including the product A. For example, if product A is 5 megapixel digital camera, the category of product may be "camera" or "digital camera." In this example, the search optimization history includes optimization data and results for search optimizations performed for previous products in the category. Those skilled in the art will appreciate that each of the previous products may be associated with a different web page.

The search optimization history may be configured to allow search optimizations to be performed based on historical search optimizations for the category of product including the product A. In other words, the search optimization history provides objective results (i.e., search ranking) of previous search optimizations along with the optimization data for each of the previous search optimizations, allowing for search optimizations that leverage the objective results to be generated. For example, recommendations used in a previous search optimization resulting in a significant increase in search ranking may be favored over recommendations used in a less successful search optimization.

In Step 404, the search optimization history is updated based on the search optimization for product A in accordance with one or more embodiments of the invention. Specifically, after the optimization data is implemented for web page A and the corresponding search ranking is updated, the optimization data and resulting search ranking of web page A may be included in the search optimization history. In addition, the search ranking of web page A may be monitored to include further updates of the search ranking for web page A.

In Step 406, a search optimization is performed for product B of web page B using the search optimization history in accordance with one or more embodiments of the invention. In one or more embodiments of the invention, the search optimization for product B is performed as described with respect to Step 402. In this case, the search optimization for product B is further based on the optimization data and resulting search ranking for product A.

In Step 408, the search optimization history is further updated based on the search optimization for product B in accordance with one or more embodiments of the invention. Specifically, after the optimization data is implemented for web page B and the search ranking is updated, the optimization data and resulting search ranking of web page B may be included in the search optimization history. In addition, the search ranking of web page B may be monitored to include further updates of the search ranking of web page B.

Those skilled in the art will appreciate that a search optimization as described in Steps 402-404 may be repeated for any number of products in the category of product associated with the search optimization history. In this case, each subsequent search optimization of a product may be based on the history of search optimizations performed for all of the preceding products. In other words, the search optimization history may include data associated with any number of search optimizations performed for products in the category of product associated with the search optimization history.

Figure 5:
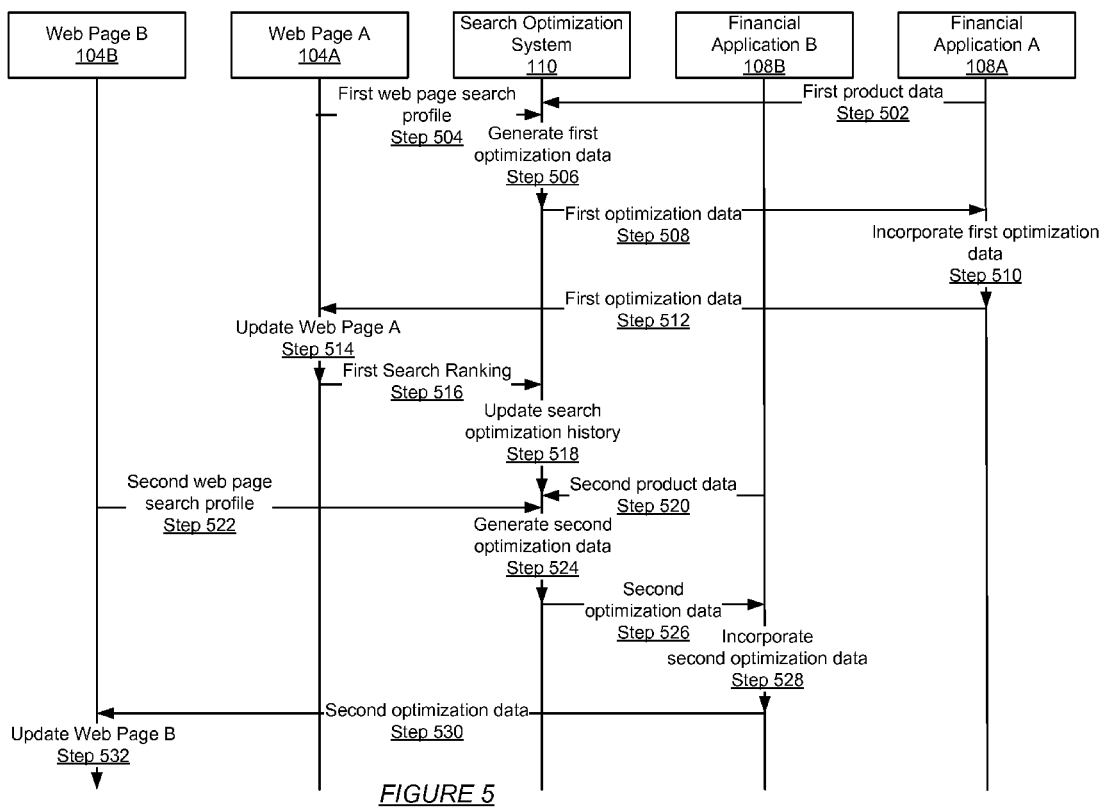

FIG. 5 shows a flow chart for performing search engine optimizations in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention. Those skilled in the art will appreciate that the following example is provided for exemplary purposes only and accordingly should not be construed as limiting the scope of the invention.

In Step 502, financial application A (108A) sends a request for a search optimization including first product data for a first product to the search optimization system (110) in accordance with one or more embodiments of the invention. The request for search optimization may be sent based on input from user A (not shown) of the financial application A (108A). The user A may specify a variety of criteria and/or data (e.g., target search engine, web page location, product data, etc.) for the requested search optimization.

In Step 504, the search optimization system (110) may obtain a first web page search profile from web page A (104A) in accordance with one or more embodiments of the invention. In this case, the web page A (104A) is included in an e-commerce site configured to sell the first product for the user A. The first web page search profile describes characteristics (e.g., keywords, content, ingoing links, outgoing links, search ranking, etc.) of the web page A (104A).

In Step 506, the search optimization system (110) generates first optimization data based on the first product data and the first web page search profile in accordance with one or more embodiments of the invention. The first optimization data may include recommendations for updating the web page A (104A) configured to increase the web traffic of the web page A (104A).

In Step 508, the search optimization system (110) sends the first optimization data to the financial application A (108A) in accordance with one or more embodiments of the invention. At this stage, the financial application A (108A) incorporates the first optimization data (Step 510). More specifically, the product data in financial application A (108A) is updated based on the updated product data included in the first optimization data.

In Step 512, the financial application A (108A) submits the recommendations included in the first optimization data to the web page A (104A) in accordance with one or more embodiments of the invention. More specifically, the financial application A (108A) uses an API and/or Web Service to submit the recommendations to a web server A (not shown) serving the web page A (104A). In response to receiving the recommendations, the web server A updates the web page A (104A) based on the recommendations (Step 514).

In Step 516, once the web page A (104A) is re-indexed by a search engine (not shown), the search optimization system (110) obtains a first search ranking for web page A (104A) in accordance with one or more embodiments of the invention. The first search ranking corresponds to the priority of web page A (104A) in searches of the search engine.

In Step 518, the search optimization engine (110) updates a search optimization history for the category of product associated with the first product sold on the web page A (104A) in accordance with one or more embodiments of the invention. More specifically, the first optimization data generated in Step 506 and the first search ranking obtain in Step 516 are included in the search optimization history.

In Step 520, financial application B (108B) sends a request for a search optimization including second product data for a second product to the search optimization system (110) in accordance with one or more embodiments of the invention. The request for search optimization may be sent based on input from user B (not shown) of the financial application B (108B). The user B may specify a variety of criteria and/or data (e.g., target search engine, web page location, product data, etc.) for the requested search optimization.

In Step 522, the search optimization system (110) obtains a second web page search profile from web page B (104B) in accordance with one or more embodiments of the invention. In this case, the web page B (104B) is included in an e-commerce site configured to sell the second product for the user B. The second web page search profile describes characteristics (e.g., keywords, content, ingoing links, outgoing links, etc.) of the web page B (104B).

In Step 524, the search optimization system (110) generates second optimization data based on the second product data and the second web page search profile in accordance with one or more embodiments of the invention. In this case, the second optimization data is also generated based on the search optimization history updated in Step 518. More specifically, the recommendations included in the second optimization data may also be generated based on the first optimization data and the resulting search ranking for web page A (104A). For example, assuming the update of web page A (104A) resulted in an increase of search ranking for web page A (104A), the recommendations included in the first optimization data may be favored in generating the second optimization data for web page B (104B). The optimization data includes recommendations for updating the web page B (104B) to increase the web traffic of the web page B (104B).

In Step 526, the search optimization system (110) sends the second optimization data to the financial application B (108B) in accordance with one or more embodiments of the invention. At this stage, the financial application B (108B) incorporates the second optimization data (Step 528). More specifically, the product data in financial application B (108B) is updated based on the updated product data included in the second optimization data.

In Step 530, the financial application B (108B) submits the recommendations included in the second optimization data to the web page B (104B) in accordance with one or more embodiments of the invention. More specifically, the user B of the financial application B (108B) may use a web server B (not shown) to submit the recommendations, where the web server B serves the web page B (104B). In response to receiving the recommendations, the web server B updates the web page A (104A) based on the recommendations (Step 532).

Figure 6:
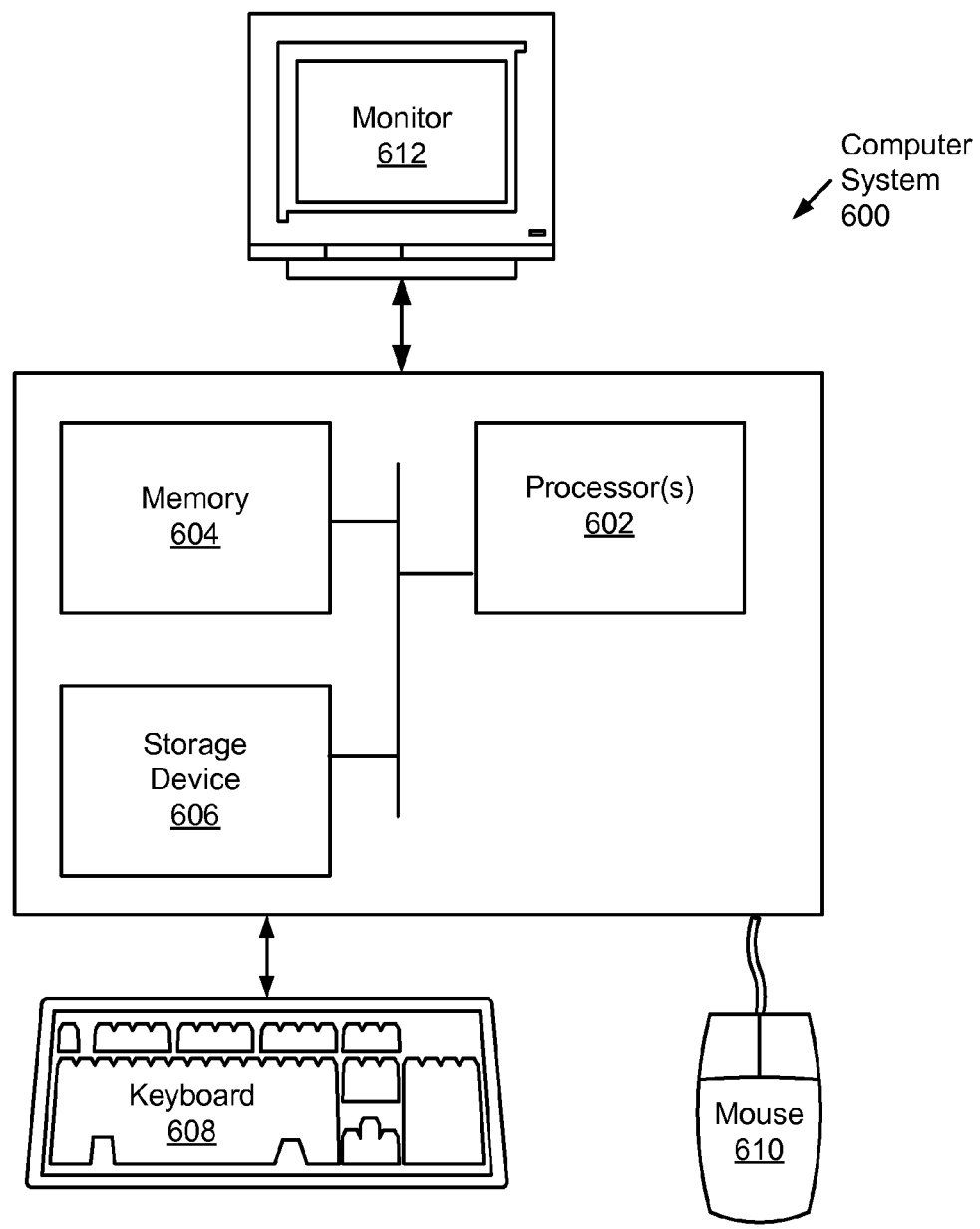
FIG. 6 shows a computer system in accordance with one or more embodiments of the invention.

The invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) may be a desktop computer, a laptop computer, a personal media device, a mobile device, such as a cell phone or personal digital assistant, or any other computing system capable of executing computer readable instructions. The networked computer system (600) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (600) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a computer readable medium such as a compact disc (CD), a diskette, a tape, a file, or any other computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing search engine optimizations, comprising:
    obtaining product data from a first financial application, wherein the first financial application is configured to manage a plurality of products, and wherein the product data is associated with a first product of the plurality of products;
    processing the product data to obtain optimization data, wherein the optimization data is configured to increase web traffic of a first web page associated with the first product;
    sending the optimization data to the first financial application, wherein the first web page is updated to incorporate the optimization data;
    receiving a request for the optimization data to increase web traffic of a second web page from a second financial application, wherein the second financial application is configured to manage the first product;
    determining that the second web page is associated with the first product; and
    in response to determining that the second web page is associated with the first product, sending the optimization data for incorporation into the second web page.

2. The method of claim 1, further comprising:
    obtaining a first web page location for the first web page from the first financial application; and
    processing the first web page specified by the first web page location to obtain a web page search profile, wherein the processing of the product data to obtain the optimization data is based on the web page search profile.

3. The method of claim 2, wherein the first web page is associated with an e-commerce site for selling the first product.

4. The method of claim 3, wherein the web page search profile comprises data associated with a second product of the plurality of products sold at the e-commerce site.

5. The method of claim 1, further comprising:
    obtaining updated product data from the first financial application, wherein the updated product data is associated with the first product; and
    processing the updated product data to obtain updated optimization data, wherein the web traffic of the second web page is increased by updating the second web page using the updated optimization data.

6. The method of claim 1, wherein the optimization data comprises recommendations for updating the first web page, wherein the updating of the first web page is performed by a first user of the first financial application based on the recommendations.

7. The method of claim 1, further comprising:
    generating a predicted search ranking for the first web page based on the optimization data.

8. The method of claim 1, wherein the processing of the product data is further based on a search engine profile, wherein the search engine profile is associated with a search engine.

9. The method of claim 1, wherein the processing of the product data is based on a search optimization history, wherein the search optimization history is associated with a search optimization performed for a second product.

10. A system for performing search engine optimizations, comprising:
    a processor; and
    a memory
    an application interface stored in the memory which, when executed by the processor, is configured to:
        obtain product data from a first financial application, wherein the first financial application is configured to manage a plurality of products, and wherein the product data is associated with a first product of the plurality of products,
        send optimization data to the first financial application, wherein a first web page is configured to be updated to incorporate the optimization data, and
        receive a request for the optimization data to increase web traffic of a second web page from a second financial application, wherein the second financial application is configured to manage the first product; and
    a search optimization module stored in the memory which, when configured by the processor, is configured to:
        process the product data to obtain the optimization data, wherein the optimization data is configured to increase web traffic of a first web page associated with the first product, wherein the web page is updated to incorporate the optimization data, and
        determine that the second web page is associated with the first product,
    wherein, in response to determining that the second web page is associated with the first product, the application interface is further configured to:
        send the optimization data for incorporation into the second web page.

11. The system of claim 10, wherein:
    the application interface is further configured to obtain a first web page location for the first web page from the first financial application,
    wherein the search optimization module is further configured to process the first web page specified by the first web page location to obtain a web page search profile, wherein the processing of the product data to obtain the optimization data is based on the web page search profile.

12. The system of claim 11, wherein the first web page is associated with an e-commerce site for selling the first product.

13. The system of claim 12, wherein the web page search profile comprises data associated with a second product of the plurality of products sold at the e-commerce site.

14. The system of claim 10, wherein:
    the application interface is further configured to obtain updated product data from the first financial application, wherein the updated product data is associated with the first product,
    wherein the search optimization module is further configured to process the updated product data to obtain updated optimization data, wherein the web traffic of the second web page is increased by updating the second web page using the updated optimization data.

15. The system of claim 10, wherein the optimization data comprises recommendations for updating the first web page, wherein the updating of the first web page is performed by a first user of the first financial application based on the recommendations.

16. The system of claim 10, wherein the search optimization module is further configured generate a predicted search ranking for the first web page based on the optimization data.

17. The system of claim 10, wherein the processing of the product data is further based on a search engine profile, wherein the search engine profile is associated with a search engine.

18. The system of claim 10, wherein the processing of the product data is based on a search optimization history, wherein the search optimization history is associated with a search optimization performed for a second product.

19. A non-transitory computer readable storage medium, embodying instructions executable by the computer to perform method steps for search engine optimizations, the instructions comprising functionality to:
  obtain product data from a first financial application, wherein the first financial application is configured to manage a plurality of products, and wherein the product data is associated with a first product of the plurality of products;
  process the product data to obtain optimization data, wherein the optimization data is configured to increase web traffic of a first web page associated with the first product;
  send the optimization data to the first financial application, wherein the first web page is updated to incorporate the optimization data;
  receive a request for the optimization data to increase web traffic of a second web page from a second financial application, wherein the second financial application is configured to manage the first product;
  determine that the second web page is associated with the first product; and
  in response to determining that the second web page is associated with the first product, send the optimization data for incorporation into the second web page.

20. The non-transitory computer readable storage medium of claim 19, the instructions further comprising functionality to:
  obtain a first web page location for the first web page from the first financial application; and
  process the first web page specified by the first web page location to obtain a web page search profile, wherein the processing of the product data to obtain the optimization data is based on the web page search profile.

21. The non-transitory computer readable storage medium of claim 20, wherein the first web page is associated with an e-commerce site for selling the first product.

22. The non-transitory computer readable storage medium of claim 21, wherein the web page search profile comprises data associated with a second product of the plurality of products sold at the commerce site.

23. The non-transitory computer readable storage medium of claim 19, the instructions further comprising functionality to:
  obtain updated product data from the first financial application, wherein the updated product data is associated with the first product; and
  process the updated product data to obtain updated optimization data, wherein the web traffic of the second web page is increased by updating the second web page using the updated optimization data.

24. The non-transitory computer readable storage medium of claim 19, wherein the optimization data comprises recommendations for updating the first web page, wherein the updating of the first web page is performed by a first user of the first financial application based on the recommendations.

25. The non-transitory computer readable storage medium of claim 19, the instructions further comprising functionality to:
  generate a predicted search ranking for the first web page based on the optimization data.

26. The non-transitory computer readable storage medium of claim 19, wherein the processing of the product data is further based on a search engine profile, wherein the search engine profile is associated with a search engine.

27. The non-transitory computer readable storage medium of claim 19, wherein the processing of the product data is based on a search optimization history, wherein the search optimization history is associated with a search optimization performed for a second product.

* * * * *